(12) United States Patent
Semmes (10) Patent No.: US 9,500,288 B2
(45) Date of Patent: Nov. 22, 2016

(54) COMBINED CONTROL AND FLOW SENSING VALVE

(71) Applicant: Thomas Middleton Semmes, Millington, TN (US)

(72) Inventor: Thomas Middleton Semmes, Millington, TN (US)

( * ) Notice: Subject to any disclaimer, the term of this patent is extended or adjusted under 35 U.S.C. 154(b) by 8 days.

(21) Appl. No.: 14/749,971

(22) Filed: Jun. 25, 2015

(65) Prior Publication Data

US 2015/0345649 A1     Dec. 3, 2015

Related U.S. Application Data

(63) Continuation-in-part of application No. 14/085,423, filed on Nov. 20, 2013, now Pat. No. 9,097,354.

(51) Int. Cl.
*F16K 11/08*     (2006.01)
*F16K 11/085*    (2006.01)

(52) U.S. Cl.
CPC .... *F16K 11/0856* (2013.01); *Y10T 137/86566* (2015.04); *Y10T 137/86654* (2015.04)

(58) Field of Classification Search
USPC ................................ 137/625.19, 551; 73/198
See application file for complete search history.

(56) References Cited

U.S. PATENT DOCUMENTS

| | | | | | |
|---|---|---|---|---|---|
| 2,332,882 | A | * | 10/1943 | Abbatiello | F28D 7/1646 137/340 |
| 3,908,697 | A | * | 9/1975 | Witzel | F16K 11/0836 137/625.47 |
| 4,726,391 | A | * | 2/1988 | Barra | F16K 11/083 137/246 |
| 5,065,901 | A | * | 11/1991 | Brane | G01F 1/06 137/624.11 |
| 7,610,931 | B2 | * | 11/2009 | Wittig | F16K 11/20 137/551 |

* cited by examiner

*Primary Examiner* — John Fox
(74) *Attorney, Agent, or Firm* — Mark S Hubert (57) ABSTRACT

A slim profile rotary control valve capable of independently modulating fluids into a single heat exchanger from two different and distinct systems that utilize the same type of heat transfer fluid. The valve is capable of monitoring both the supply and return fluid temperatures as well as the mass flow to enable the valve controller to optimize system's energy efficiency. It eliminates the use of multiple valves currently used in a conventional changeover system and automated control of valve positioning works much superior to existing valves. The housing and inner cylinder have tapered profiles to enable rotary sealing between the inlet and outlet ports. The housing has flow characterization profiles machined into the outlet ports thus eliminating the need for characterization disks. The rotary valve has a geometry that allows for a no flow dead zone when no heat exchange is so demanded.

20 Claims, 12 Drawing Sheets

COMBINED CONTROL AND FLOW SENSING VALVE

The following application is a continuation in part (CIP) application based on the co-pending utility application Ser. No. 14/085,423 filed Nov. 20, 2013 which was a CIP based on then co-pending utility application Ser. No. 12/815,240 filed Jun. 14, 2010 (now abandoned). The following application incorporates by reference all material disclosed therein both prior applications.

BACKGROUND OF THE INVENTION

The present invention relates to a extremely versatile combined valve and flowrater that can be used in a plethora of HVAC situations including for changeover operation, heating and cooling modulation and energy monitoring and control. It provides system simplicity and energy efficiency.

Current HVAC systems employ multiple heat transfer surfaces in order to recover energy, preheat, heat, cool and dehumidify the supply airflow. Each of these heat transfer devices impart air friction, and in turn consumes fan energy. By using a single heat transfer surface for heat recovery, preheat, heat and cool, there is a reduction in the quantity of devices, air friction and resultant fan energy. The current invention results in a new type of valve which can allow multiple piping systems to share the usage of a common coil. The valve will allow hot and chilled water piping systems with the same type of fluid to utilize a single heat transfer device. The valve will combine numerous functions into a single valve which has not heretofore been done.

Henceforth, combined changeover and control valve combined with a flowrater would fulfill a long felt need in the HVAC industry. This new invention utilizes and combines known and new technologies in a unique and novel configuration to overcome the aforementioned problems and accomplish this. This new valve will allow buildings using hot and chilled water distribution systems to have improved efficiency especially if lowering the conventional return hot water temperature from 160 down to below 100 deg F. In air handling units, fan energy is reduced as there is only a single coil providing both the heating and cooling functions.

SUMMARY OF THE INVENTION

The general purpose of the present invention, which will be described subsequently in greater detail, is to provide a combined rotary valve and flowrater that is able to improve HVAC fan and heating efficiency and simplify systems by reducing the quantity of valves, heat exchangers and controls.

It has many of the advantages mentioned heretofore and many novel features that result in a new and improved combined valve and flowrater which is not anticipated, rendered obvious, suggested, or even implied by any of the prior art, either alone or in any combination thereof.

In accordance with the invention, an object of the present invention is to provide an improved single combined valve and flowrater capable of providing the supply and return fluid from one of two different systems to a single coil completely independently.

It is another object of this invention to provide an improved single valve and flowrater capable of modulating both the heating and cooling functions of a single coil and that has a reduced profile having an inner cylinder that rotationally can seal fluids against and within an outer cylinder having a mating configured geometry.

It is a further object of this invention to provide a single combined valve and flowrater capable of providing improved temperature control of heating and cooling with a single control output accomplished by a modulating each fluid through a tapered or characterized shaped ports.

It is yet a further object of this invention to provide a rotary valve and flowrater combination with a geometry that allows for a no flow dead zone when no heat exchange is so demanded.

It is yet a further object of this invention to provide an improved combined valve and flowrater capable of modulating cooling and heating to a coil as well as having a supply pressure independent control and having the capability of measuring the fluid flowrate, fluid temperature to and temperature from heat exchanger, thereby allowing delivered energy to be calculated monitored and accumulated.

It is another object of this invention to promote energy recovery with four pipe water to water heat pumps with a tapered or characterized flow profile that enables more precise automatic temperature adjustment without excessive operational valve movement.

It is yet another object of this invention to enable computer adjustment of minimum cool, maximum cool, minimum heat and maximum heat fluid flow and low energy with a minimum of automated valve manipulation or control. Hunting and over compensation of the valve positioning as well as the attendant temperature swings should be minimized.

It is yet another object of this invention to enable computer monitoring of flow and return water temperature to provide freeze management of heat exchanger. For any given heat exchanger there is a minimum flow and a minimum temperature which will indicate that heat exchanger is in danger of fluid freezing within the heat exchanger passages.

It is another object of this invention to provide an improved valve and flowrater combination utilizing single port cutoff flow control such that when there is no change in the associated heat exchanger, all flows into or out of the heat exchanger are stopped.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

The term "flowrater" as used herein is synonymous with the term "flow meter" and refers to a device installed into or onto piping/tubing that measure the flow of the fluid within the pipe at that point. It may just give a visual indication of the rate of flow (generally these are referred to as flowrater rotors) or it may send a signal representative of the rate of flow that is manifested into a readable value on a visual scale, meter, electronic or computer readout.

The present invention is a dual chamber, tapered cylindrical valve designed for system simplicity and energy efficiency in a plethora of HVAC situations. It sees its full potential when used for changeover operation, heating and cooling modulation. Although discussed herein as a valve for use with a heat exchanger that utilizes hot and chilled water from two different systems to heat or cool the secondary side of the heat exchanger, it is known that the valve has a plethora of different applications and numerous fluids/gasses could be used in accordance therewith. For this reason what is termed herein as a heat exchanger return port and a heat exchanger supply port may also be termed a valve return port and a valve supply port as they need not be connected to a heat exchanger. Here, cold and hot fluid media from two separate and distinct fluid media systems may be each alternately introduced into a single heat exchanger and controlled/monitored efficiently and with the use of a single characterized flow valve that is able to shut off all flow to the inlet or outlet lines rather than continue valve positioning movement through a transition point wherein the flow of the inlet line must be directed to both of the hot and cold fluid media lines simultaneously.

Figure 1:
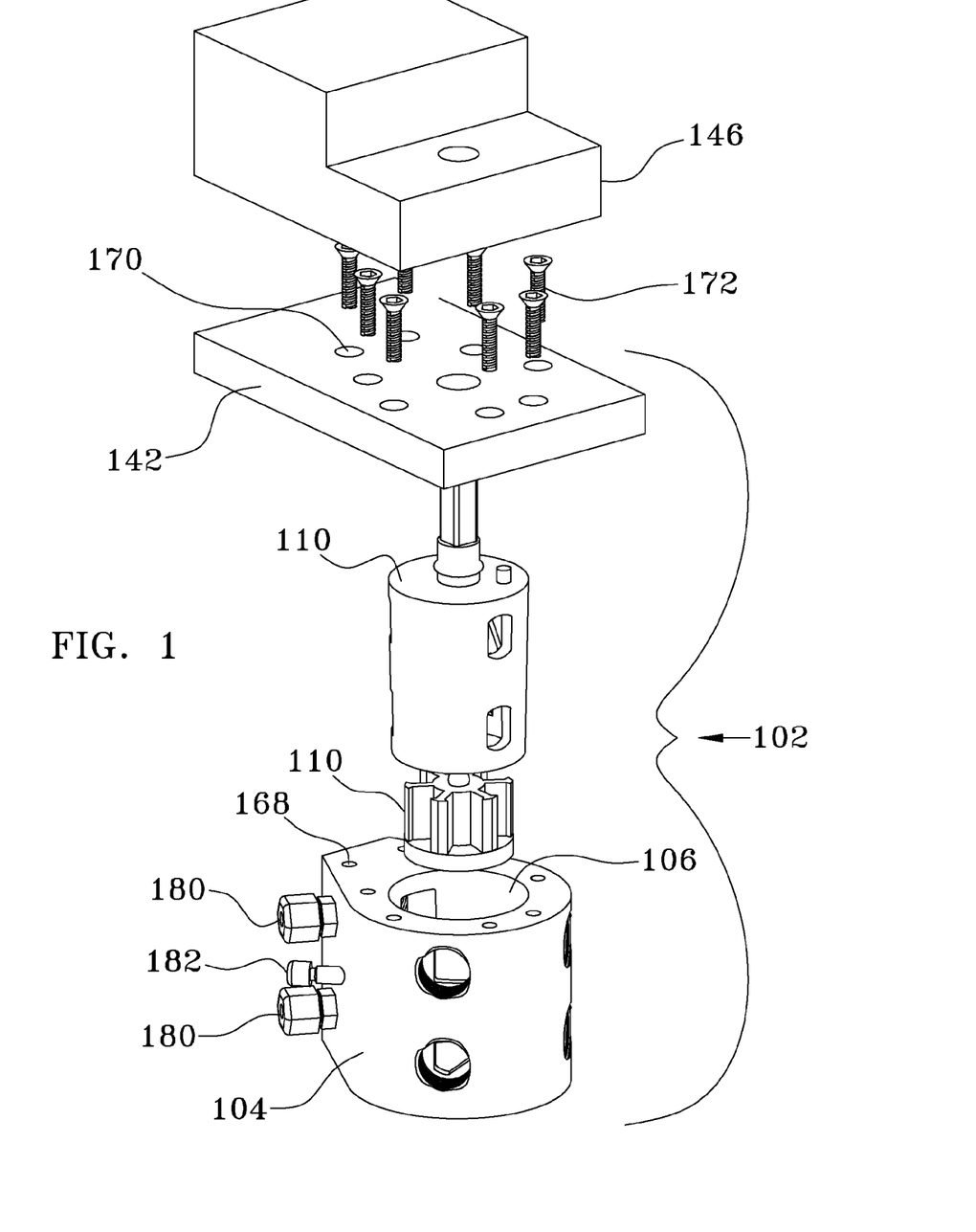
FIG. 1 is an isomeric exploded perspective view of the valve and attached actuator showing the general arrangement of all components.
Figure 2:
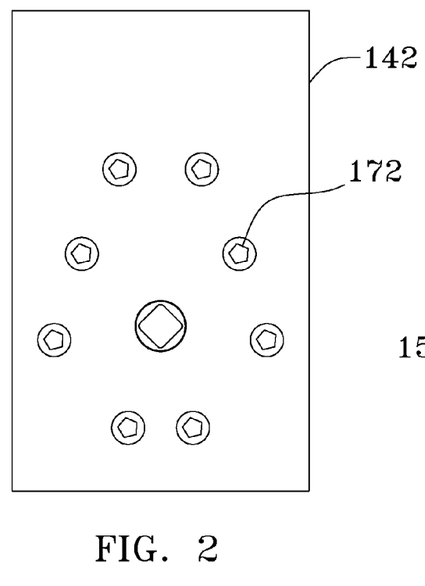
FIG. 2 is a top view of the valve.
Figure 3:
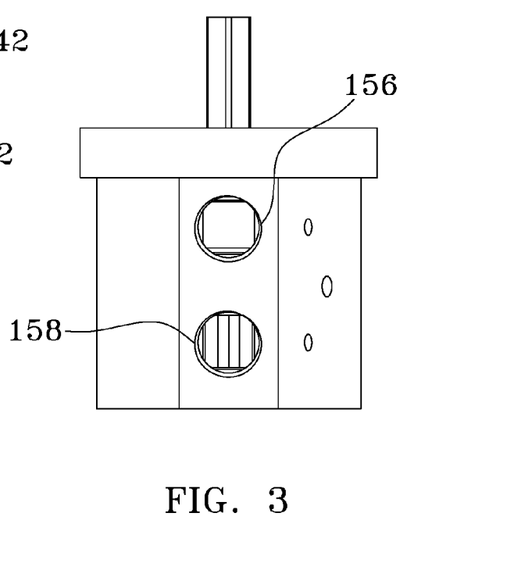
FIG. 3 is a rear view of the valve.
Figure 4:
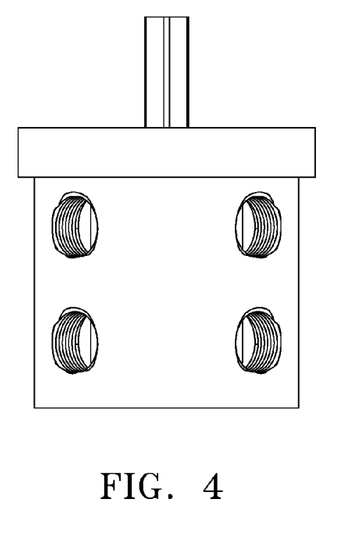
FIG. 4 is a front view of the valve.
Figure 5:
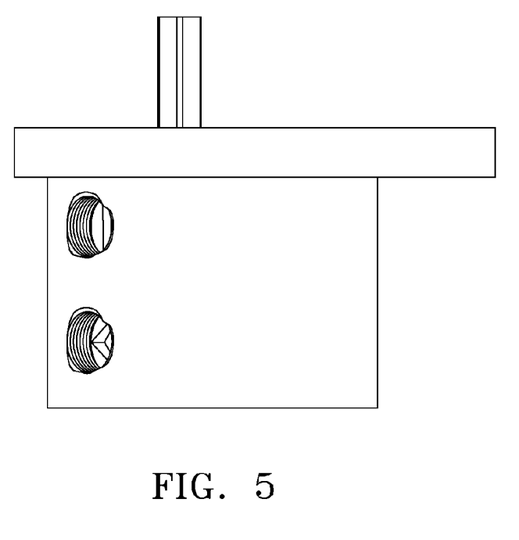
FIG. 5 is a side view of the valve.
Figure 6:
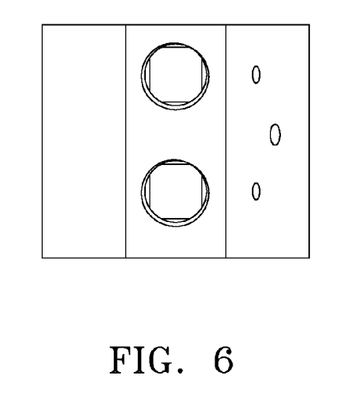
FIG. 6 is a rear view of the valve housing without the top plate.
Figure 7:
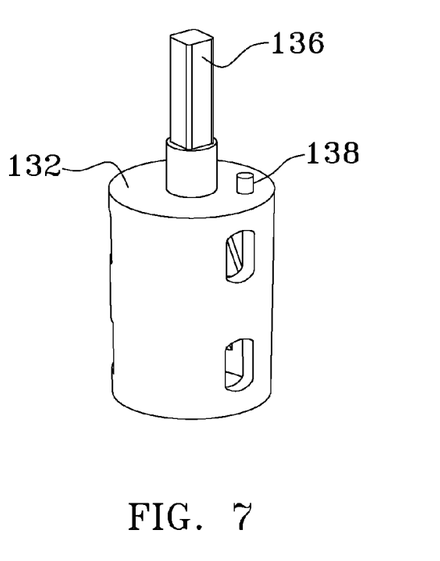
FIG. 7 is a perspective view of the valve cylinder.
Figure 8:
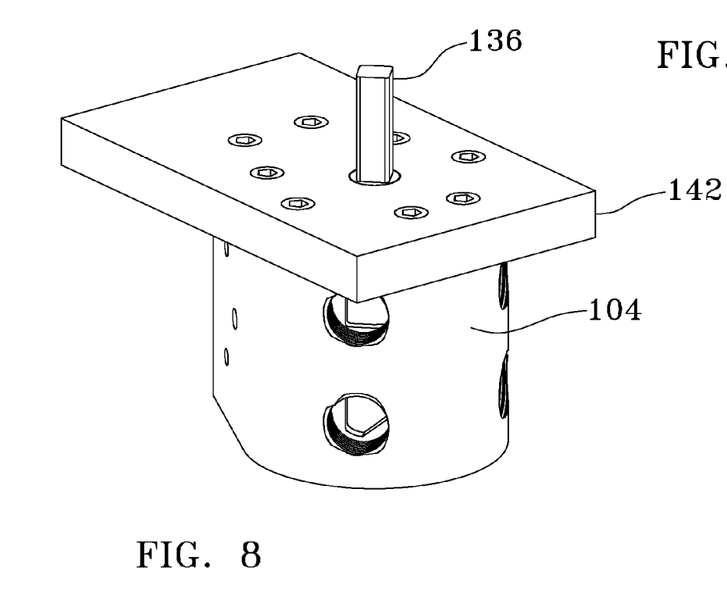
FIG. 8 is a perspective of the valve without the actuator.
Figure 9:
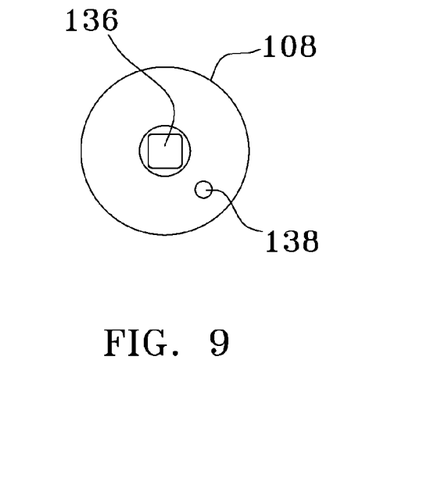
FIG. 9 is a top view of the valve cylinder.
Figure 35:
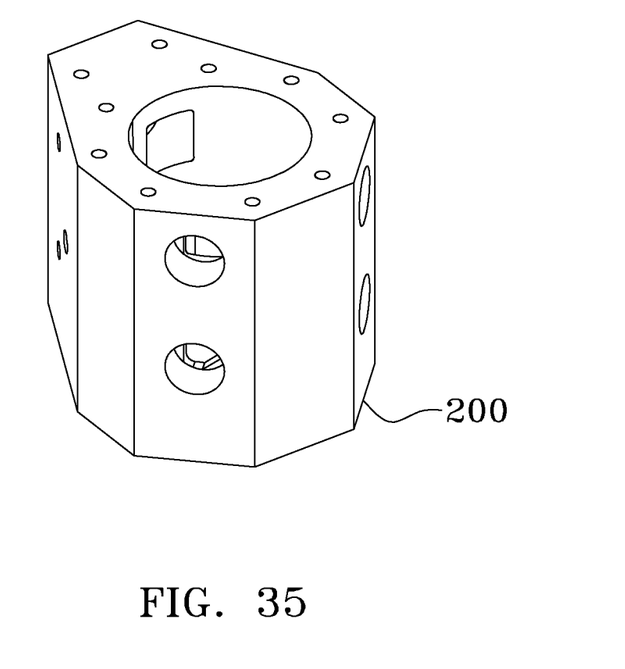
FIG. 35 is a perspective view of an alternate embodiment valve housing.

Key to the understanding of the operation of this valve is that for changeover operation in the heating or cooling of a heat exchanger, either the hot or cold fluid medium (e.g. cold water) or the second heat transfer medium (e.g. hot water) independently and alone will be circulated through the heat exchanger. These two heat transfer media come from their own independent systems (e.g. chilled water or hot water systems) but contain the same type of heat transfer fluid. Generally, to accomplish this switching of heat transfer media with the prior art technology required multiple valves, actuators and controllers. The present invention uses dual, parallel (simultaneously) operated, cylinder chambers and the chambers are not in direct fluid communication with each other. Although described herein the drawings and specification with the upper chamber designated as the return chamber and the lower chamber designated as the supply chamber, these designations may be reversed with the functional and structural features of the lower chamber and upper chamber remaining unchanged. I.E. the lower chamber could be the return chamber with the flowrater (rotor) measuring the supply flow and the housing's cold and hot water supply ports would be equilateral triangular shaped with two radiused to help characterize the supply flows Looking at FIG. 1 the exploded general arrangement of the preferred embodiment power operated rotary valve 102 with a combined flowrater unit 110 can be seen. The rounded valve housing (body) 104 is a unitary body with a stopped, tapered, central bore 106 formed therein about its longitudinal axis to matingly engage the correspondingly tapered valve cylinder 108 and flowrater unit (rotor) 110 (FIGS. 14-17). In an alternate embodiment a unitary, hexagonal valve housing 200 (FIG. 35) replaces the rounded valve housing 104. This hexagonal shape is utilized for specific condition to support different piping connections. Its operation remains unchanged from that of the rounded valve housing 104 of the preferred embodiment. Additional geometric external configurations of the valve housing may also be employed as would be well known in the art.

The valve cylinder 108 is divided into an upper return chamber 124 and a lower supply chamber 122, (FIG. 10) the contents of which are directed through the heat exchanger return port 156 or the heat exchanger supply port 158 of the valve housing 104 (FIG. 1) and into the supply or return lines of any connected heat exchanger. Inside this central bore 106 the flowrater unit 110 is rotationally nested inside the valve cylinder 10 (FIGS. 7 and 9-13) separated by a large bearing 112 located centrally on the top of the flowrater's central spine 114 and residing within a top detent 120 in the ceiling of the chamber 134. The flowrater unit 110 has a smaller bearing 116 centrally located on its bottom face that resides in bottom detent 130 (FIG. 18) of the valve housing 104. Each of the spherical balls bearings 110 and 116 are spherical bearings (balls) and serve as rotational bearings to allow the flowrater unit 110 to freely rotate to indicate both the direction and magnitude of fluid flow through the return chamber 124. The planar support plate 118 of the flowrater unit 110 has a smaller bearing 116 centrally located on its bottom face that resides in bottom detent 130 (FIG. 18) of the valve housing 104. Each of the bearings 110 and 116 are spherical bearings (balls) and serve as rotational bearings to allow the flowrater unit 110 to freely rotate to indicate both the direction and magnitude of fluid flow through the return chamber 124. return chamber 124. The planar support plate 118 of the flowrater unit 110 has a smaller bearing 116 centrally located on its bottom face that resides in bottom detent 130 (FIG. 18) of the valve housing 104. Each of the bearings 110 and 116 are spherical bearings (balls) and serve as rotational bearings to allow the flowrater unit 110 to freely rotate to indicate both the direction and magnitude of fluid flow through the return return chamber 124. However it is known that other rotational bearings may be substituted for the rotational bearings 110 and 116, including slippery polymer disks, planar bearings and other equivalent devices.

Although described herein and depicted with the flowrater unit 110 having the planar support plate 118 located on its bottom face, it is known that the flowrater unit 110 may be inverted such that the planar support plate 118 resides on the top of the flowrater unit 110. However, in that configuration the larger of the spherical bearings 112 would reside in the detent 130 of the support plate 118 which would be located at the top of the flowrater unit 110 and partially reside within the top detent 120 in the ceiling of the chamber 134. The smaller bearing 116 would be centrally located on the bottom of the flowrater's central spine 114 and partially reside within the bottom detent 130 in the valve housing. When installed in this manner, any debris that gets to the bottom of the stopped, tapered, central bore 106 will be flushed out with the flow of fluid. Again, here each of the bearings 110 and 116 are spherical bearings (balls) and serve as rotational bearings to allow the flowrater unit 110 to freely rotate to indicate both the direction and magnitude of fluid flow through the return chamber 124.

In other embodiments the flowrater 110 may be rotationally nested inside either the upper chamber or the lower chamber of the valve cylinder in either of the orientations and configurations described above.

The flowrater 110 is a circular disk with a central spine 144 from which extend radially, a series of vanes 170. Between each vane is a void through which the passing fluid resides on its passage across the valve cylinder 108. The passing fluid's direction and pressure on the positive displacement vanes 170 cause the flowrater to rotate (spin). The direction and magnitude of fluid flow can be signaled for remote indication through the use of a Hall Effect pickup sensor 182 with the corresponding magnet 168 which is well known in the art and not discussed further herein.

This valve cylinder 108 has the physical configuration of an almost right circular cylinder bearing a slight inward or narrowing taper (approximately 1 degree) from the top to the bottom. (FIG. 13) Although other cylindrical configurations are known and can be utilized such as non tapered and multiple tapered configurations or tapers with degrees other than the approximate 1 degree stated herein. It has two parallel round disks, the first disk 132 (FIG. 7) that forms the ceiling of the upper return chamber 124 and the second disk 134 that forms the floor of the upper return chamber 124 and the ceiling 134 of the lower supply chamber 122 FIG. 13) of the valve cylinder 11. The second disk 134 resides approximately at the longitudinal midpoint of the cylinder 108 so as to bisect the cylinder 108 into the upper return and lower supply chambers. In this way, the two chambers are of equal volume, although this need not be the case. The first disk 132 has a shaft 136 extending centrally and normally therefrom its top face as well as a valve rotation stop 138 extending normally therefrom the top face. The valve rotation stop 138 resides within an arced slot 140 in the top plate 142 and acts as a stop to limit the degrees of rotation the valve cylinder 108 can be rotated within the valve housing 104. The shaft 136 passes through an orifice 144 formed through the top plate 142 and is designed for connection to a valve actuator 146. (FIG. 1) Sealing of leakage at this shaft/top plate interface can be accomplished by various different methods as is well known in the art and may involve a design configuration that that incorporates at least one of the following: a thrust bearing; packing; seal; shim ring; or o ring. The complimentary tapers in the design of the valve cylinder 108 and the valve housing 104 along with the selection of their materials act to seal the supply and return fluids in their respective chambers.

The valve cylinder's upper chamber has a first set of ports, its lower chamber has a second set of ports, and the valve housing has a third set of ports that are sized and spaced so as to accomplish the flow directional manipulations and control set forth herein during rotation of the valve cylinder within the valve housing.

Figure 10:
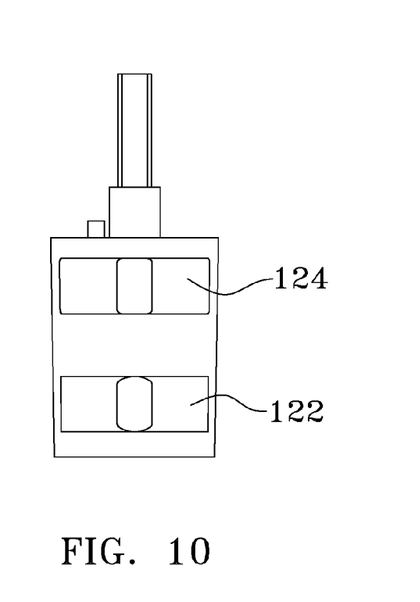
FIG. 10 is a rear view of the valve cylinder.
Figure 11:
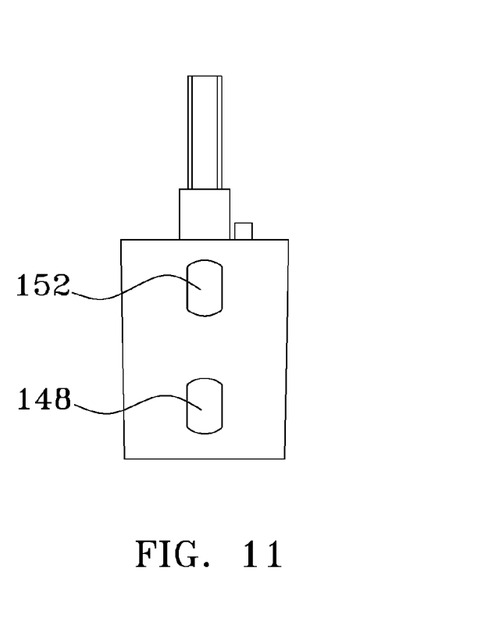
FIG. 11 is a front view of the valve cylinder.
Figure 12:
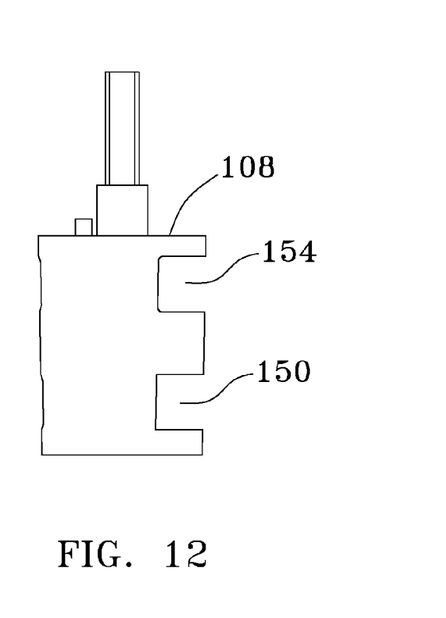
FIG. 12 is a side view of the valve cylinder.
Figure 13:
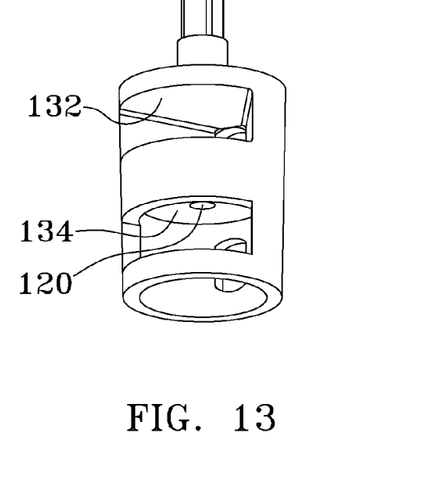
FIG. 13 is a rear perspective view of the valve cylinder.
Figure 14:
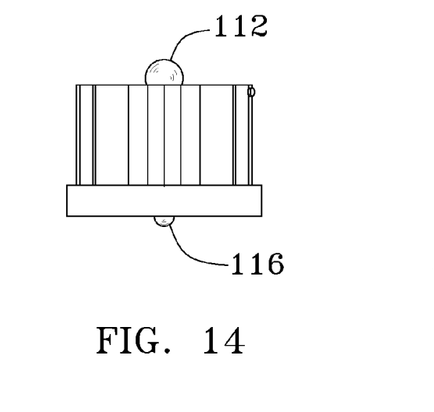
FIG. 14 is a side view of the flowrater.
Figure 15:
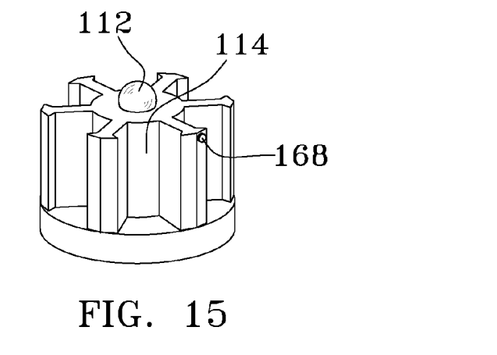
FIG. 15 is a perspective view of the flowrater.
Figure 16:
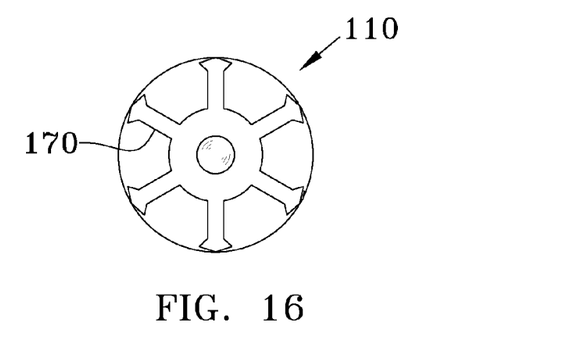
FIG. 16 is a top view of the flowrater.
Figure 17:
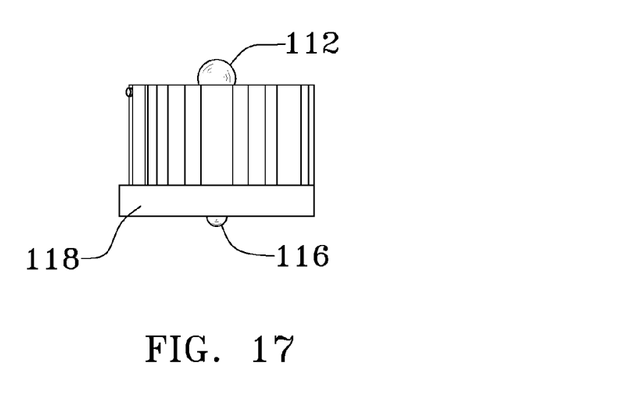
FIG. 17 is a side view of the flowrater taken 90 degrees from FIG. 14.

As can be seen in FIGS. 10-12, each of the valve cylinder's chambers has two openings. In the upper return chamber 124 there is a return crossover port 152 and a return slot port 154. In the lower supply chamber 122 there is a supply crossover port 148 and a supply slot port 150. In the valve housing 104 there are six ports.

In the top half of the housing (FIG. 20) there is heat exchanger return port 156, a cold water return port 160 and a hot water return port 166. In the bottom half of the housing there is heat exchanger supply port 158, a cold water supply port 164 and a hot water supply port 162. All of these are formed through the walls of the valve housing 104 and are fitted for mechanical connections to piping/tubing.

Looking at FIGS. 20 and 22-25, it can best be seen that the physical location of the return crossover port 152 allows for it to align fully with either the cold water return port 160 or the hot water return port 166 within the freedom of rotation it has as defined by the valve rotation stop's allowed movement within arced slot 140. Similarly, the physical location of the supply crossover port 148 allows for it to align fully with either the cold water supply port 164 or the hot water supply port 162 within the freedom of rotation it has as defined by the valve rotation stop's allowed movement within arced slot 140. Similarly, the physical location of the return crossover port 152 allows for it to align fully with either the cold water return port 160 or the hot water return port 166 within the freedom of rotation it has as defined by the valve rotation stop's allowed movement within arced slot 140.

Figure 30:
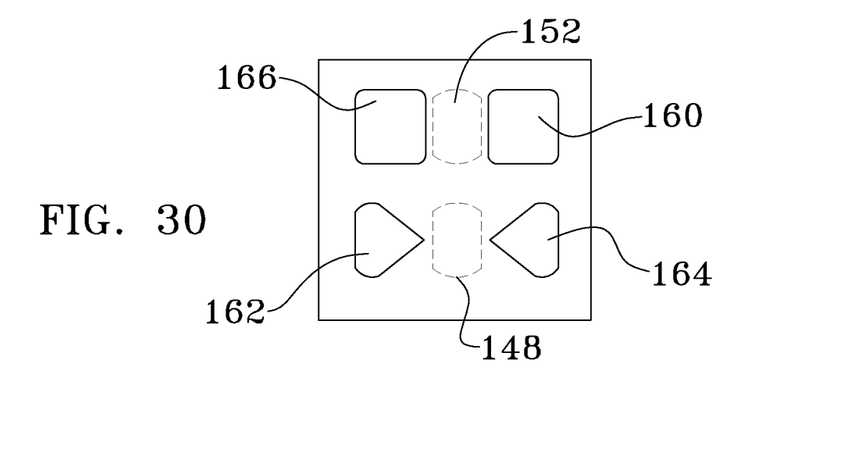
FIGS. 30-32 are front views of the valve housing ports with phantom views of the valve cylinder ports as the valve goes from closed no-flow position (45 degree of rotation) to fully open; (90 degree of rotation)
Figure 31:
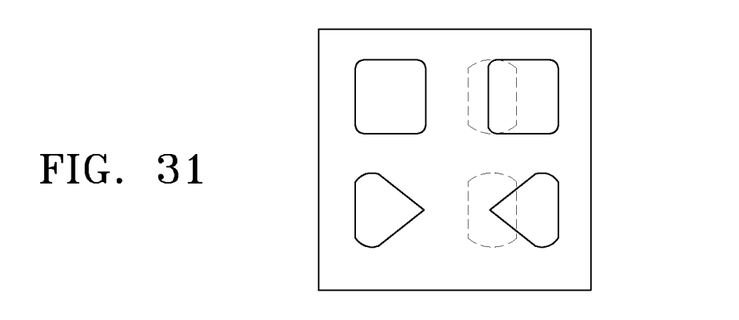
Figure 32:
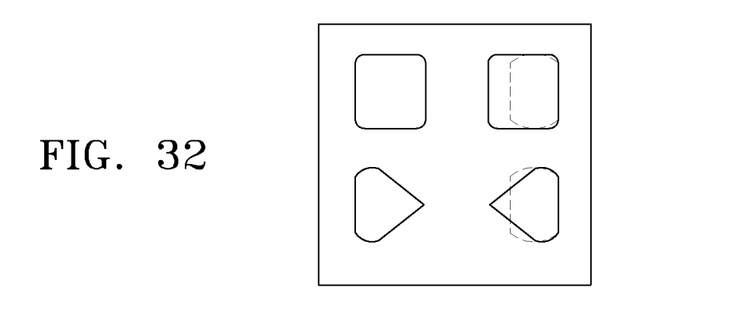

Looking at FIGS. 30-32, the spacing between the cold water return port 160 and the hot water return port 166 is sufficient to allow for the return crossover port 152 to reside between them so as to cut off flow from either return port. Similarly, the spacing between the cold water supply port 164 and the hot water supply port 162 is sufficient to allow for the supply crossover port 148 to reside between them so as to cut off flow to either supply port. The number of degrees of non-ported valve housing between the valve cutout regions occupied by the hot and cold water return ports and hot and cold water supply ports, allow for a no flow dead zone. This is an important feature that helps minimize valve modulation when the controller senses that no further change in temperature is necessary. This minimizes unnecessary valve positioning control from the automatic controller. (Thereby eliminating wear and tear on the valve and associated electronics.)

Looking now at the FIG. 10-12 slot ports 150 and 154 it can be seen that supply slot port 150 is of sufficient width that as the valve cylinder 108 rotates through the maximum extents of its limited rotation, supply slot port 150 remains positioned over the heat exchanger supply port 158. Similarly, it can be seen that return slot port 152 is of sufficient width that as the valve cylinder 108 rotates through the maximum extents of its limited rotation, return slot port 154 remains positioned over the heat exchanger return port 156. Similarly, it can be seen that return slot port 154 is of sufficient width that as the valve cylinder 108 rotates through the maximum extents of its limited rotation, return slot port 154 remains positioned over the heat exchanger return port 156.

It is important to distinguish the differences in the physical shape of the port openings between the valve cylinder 108 and the valve housing 104. Looking at FIGS. 29-32 it can be seen that the valve cylinder's crossover ports 148 and 152 have a generally rectangular configuration with arced parallel top and bottom sides. The valve housing's cold and hot water return ports 160 and 166 are generally square with radiused corners and are physically larger than the valve cylinder's crossover ports 148 and 152. In this way there is minimal restriction offered by the valve housing's supply ports and the volume of coolant allowed to the heat exchanger is maximized.

The valve housing's cold and hot water supply ports 164 and 162 are equilateral triangular shaped with two radiused corners. The non-radiused corners face each other. This configuration serves to help characterize the flow. It allows the flow through the valve 102 to have a more tapered response to the percentage opening of the valve and the flow of fluid through the valve (often referred to as characterizing). When a valve has radical changes in flow with a small opening, that valve has greatly reduced its usefulness for control applications. Characterizing the supply ports of the valve so that it has close to an equal percentage characteristic ensures good stability of control. This type of characteristic produces a linear variation in thermal output according to the amount of opening of the valve. The increase in flow as the valve is opened is very slow and controlled. This produces better part-load behavior and improved stability of control while also optimizing energy consumption. Because of this design, there is no need for a separately installed flow restricting orifice or characterization disk to customize the flow response to match a more linear heat transfer result.

Figure 18:
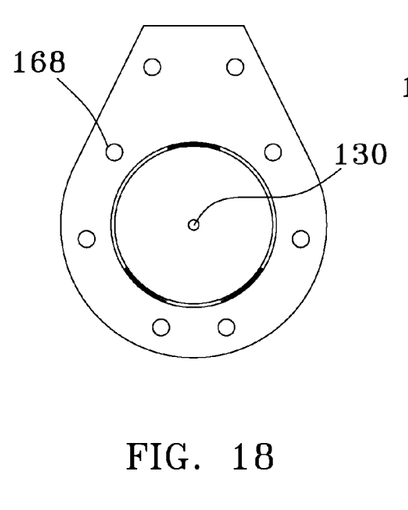
FIG. 18 is a top view of the valve housing with the flowrater and valve cylinder removed.
Figure 19:
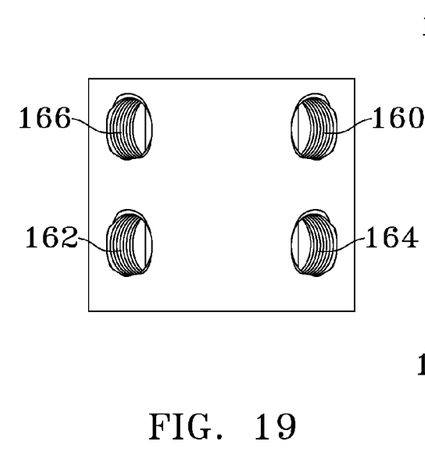
FIG. 19 is a front view of the valve housing.
Figure 28:
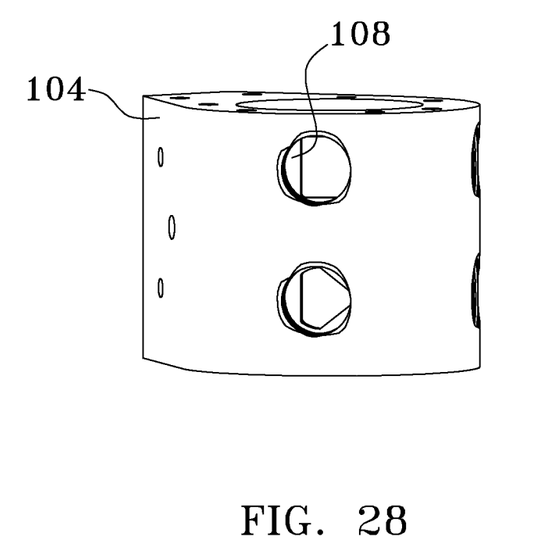
FIG. 28 is a side perspective view of the valve housing and valve cylinder.
Figure 29:
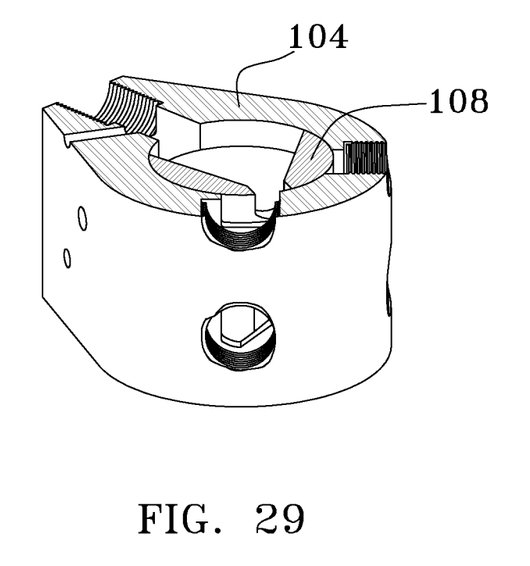
FIG. 29 is a front perspective cutaway view of the valve housing and valve cylinder showing the port designs.

From FIG. 18 and FIG. 28, about the periphery of the valve housing 104 there are a series of threaded orifices 168 that align with a series of orifices 170 in the top plate 142 so as to allow threaded engagement between screws/bolts 172 which pass through orifices 170 and threadingly engage threaded orifices 168 to affix the top plate 142 to the valve housing 104.

About the exterior sides of the valve body 104, all of the various ports formed through the walls of the valve body are depicted as having internal threads, however a smooth walled embodiment may be utilized when it is desirable to solder in the piping connections to the valve 102. Alternately the pipe connections may protrude from housing to allow the use of flanged connectors or grooved connectors or clamp ring connectors or other connectors common for connecting end devices to piping.

The top square section of the valve shaft 136 fits into a matingly engagable section of a valve actuator 146. The valve actuator 146 is a commercially available rotary actuator that operates through an approximately 90 degree rotation with additional adjustment for rotary motion at each extent of its rotation travel. Such actuators and the setup and operation of the associated control logic is well known in the industry and is not the subject of further explanation her. It suffices to say that the present invention is completely compatible with the plethora of existing valve controllers now on the market.

In operation, it is to be noted that the valve cylinder 108 only rotates clockwise and counterclockwise approximately 90 degrees within the valve housing 104 with the actual number of degrees of rotation set by the arc of slot 140.

Looking at FIGS. 22 to 25 with respect to the valve's operation it is important to note that heat exchanger return port 156 and heat exchanger supply port 158 are fully open at all times by virtue of the width of the supply slot port 150 and return slot port 154 and the limited degrees of rotation of the valve cylinder 108 within the valve housing 104. It is also important to note that the upper cylinder and lower cylinder move in unison and that all the corresponding return ports and supply ports reside in horizontal alignment with each other.

For this valve's operational design to work, it is critical that the width of the cold and hot water return ports 160 and 166 as well as cold and hot water supply ports 164 and 162 do not exceed ⅓ of the number of degrees of rotation of the valve cylinder 108 within the valve housing 104 (Here that would be 30 degrees) and that they reside apart at least ⅓ of the number of degrees of rotation of the valve cylinder 108. (Again here that would be 30 degrees.)

Figure 20:
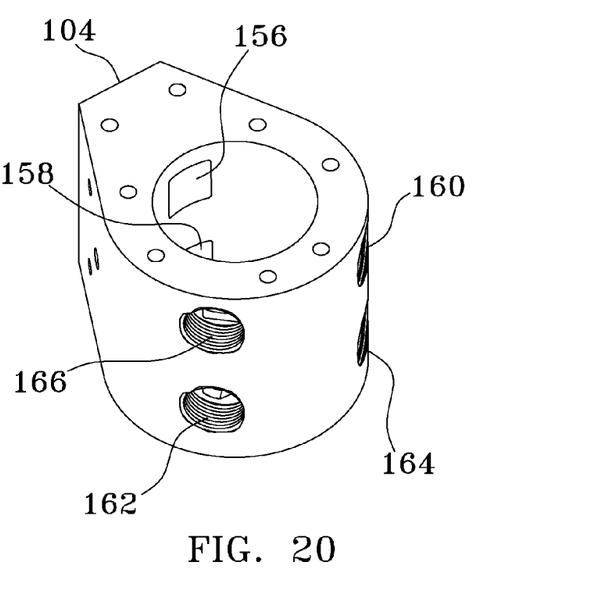
FIG. 20 is a perspective view of the valve housing.
Figure 21:
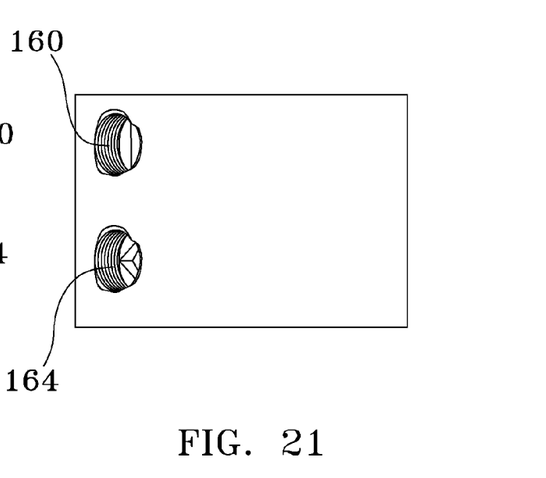
FIG. 21 is a side view of the valve housing.
Figure 22:
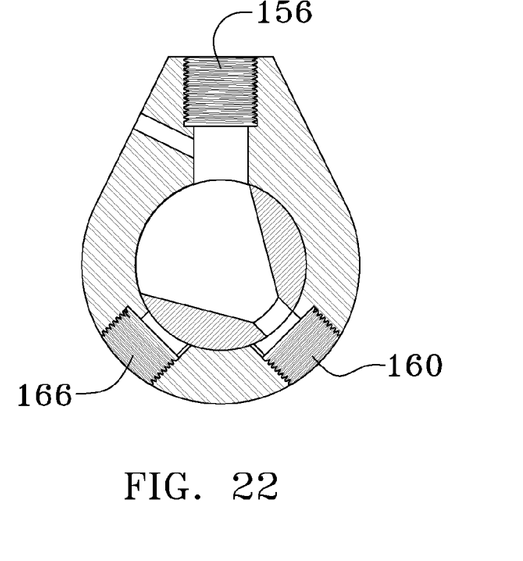
FIG. 22 is a top cutaway view of the valve with the valve cylinder rotated to the first system fluid position.
Figure 23:
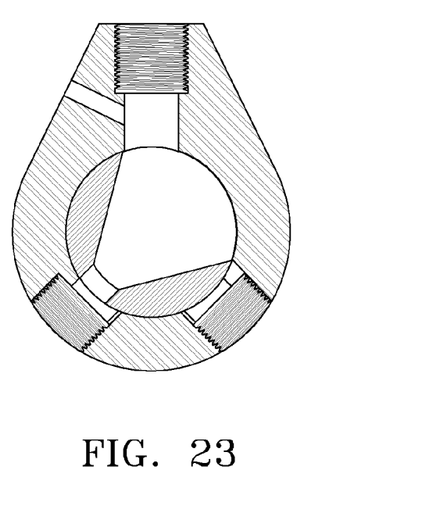
FIG. 23 is a top cutaway view of the valve with the valve cylinder rotated to the second system fluid position.
Figure 24:
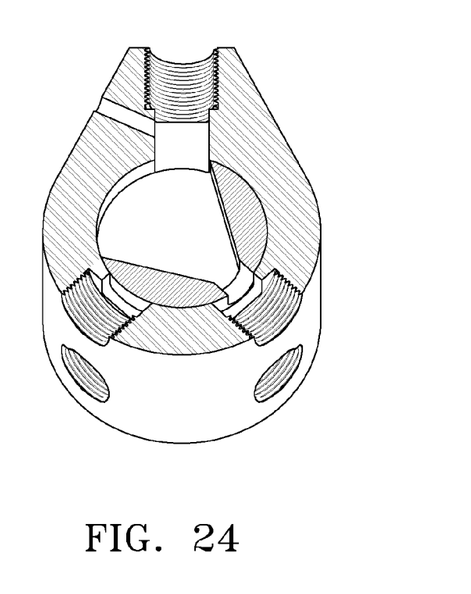
FIG. 24 is a top perspective cutaway view of the valve with the valve cylinder rotated to the first system fluid position.
Figure 25:
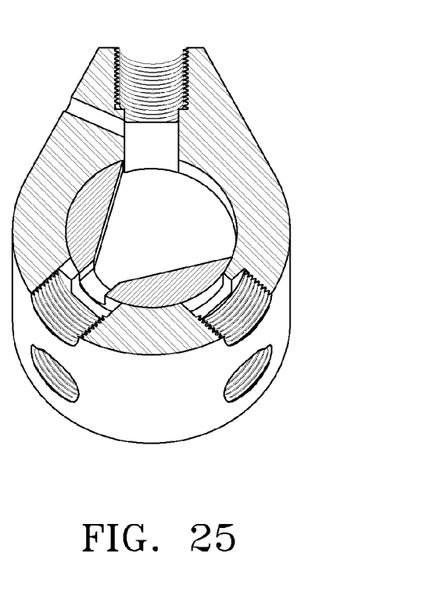
FIG. 25 is a top perspective cutaway view of the valve with the valve cylinder rotated to the second system fluid position.
Figure 26:
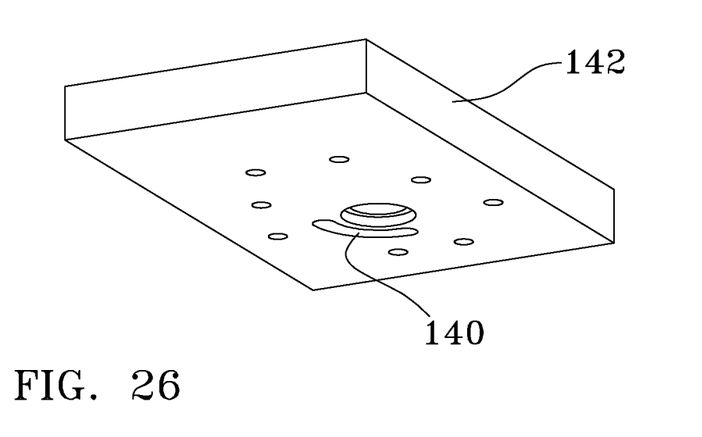
FIG. 26 is a bottom perspective view of the top plate.
Figure 27:
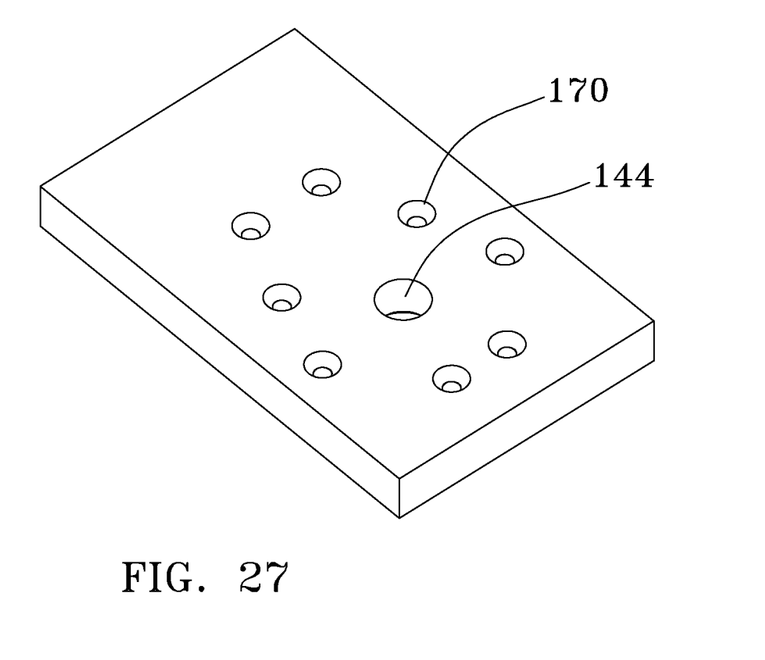
FIG. 27 is a top perspective view of the top plate.

On FIGS. 10-12 showing the cylinder as interfacing with housing FIG. 20, it is also critical that the width of cylinder supply slot port 150 and cylinder return slot port 154 is at a minimum the 4/3 the number of degrees of rotation of the valve cylinder 108 in the valve housing 104. (Here that would be 120 degrees) and that the heat exchanger supply port 158 reside more than the number of degrees of rotation of the valve cylinder 108 in the valve housing 104 away from either cold and hot water return ports 160 and 166. Similarly, the heat exchanger supply port 158 must reside more than the number of degrees of rotation of the valve cylinder 108 in the valve housing 104 away from either the cold and hot water supply ports 164 and 162. It is also critical that the width of supply slot port 150 and return slot port 154 is at a minimum the 4/3 the number of degrees of rotation of the valve cylinder 108 in the valve housing 104. (Here that would be 120 degrees) and that the heat exchanger supply port 158 reside more than the number of degrees of rotation of the valve cylinder 108 in the valve housing 104 away from either cold and hot water supply ports 162 and 164. Similarly, the heat exchanger return port 156 must reside more than the number of degrees of rotation of the valve cylinder 108 in the valve housing 104 away from either the cold and hot water return ports 160 and 166. (Here that would be 90 degrees.) The supply crossover port 148 of the valve cylinder 108 is sized smaller in area than both the cold and hot water supply ports 164 and 162 of the valve housing 104. Similarly, the return crossover port 152 of the valve cylinder 108 is smaller in area than the cold and hot water return ports 160 and 166 of the valve housing 104.

Figure 33:
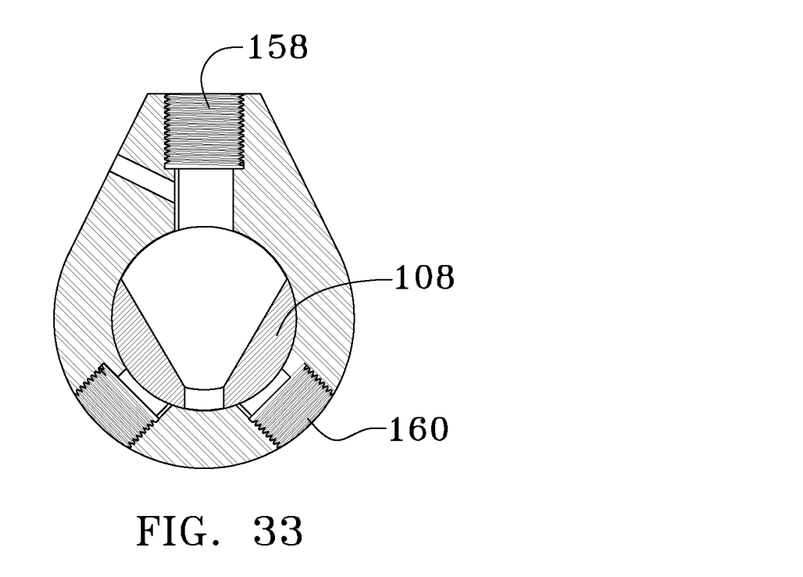
FIG. 33 is a top view of the valve in a closed no-flow position.
Figure 34:
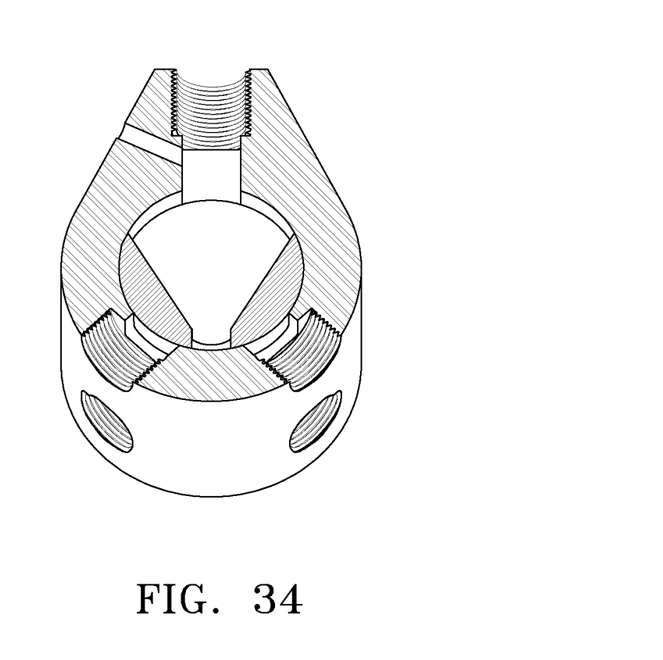
FIG. 34 is a perspective view of the valve in a closed, no-flow position.

In this way the opening of the supply crossover port 148 in the valve cylinder 108 may be rotationally positioned between cold and hot water supply ports 164 and 162 of the valve housing 104 so as to close off the flow from either of the heat transfer media through the valve cylinder 108 and into the heat exchanger. This can best be seen in FIGS. 33 and 34. If a throttled flow is desired through the valve 102 the valve cylinder 108 is rotated to a position where the supply crossover port 148 does not totally align with either of the cold or hot water supply ports 164 and 162 of the valve housing 104. When a full flow of either of the hot or cold water is desired, the supply port 158 is completely aligned with either of the cold or hot water supply ports 164 and 162 of the valve housing 104. When changeover between the two different heat transfer medias is required the valve cylinder 108 must be rotated through a position wherein the supply crossover port 148 is sealed against the inner wall of the valve housing 104.

Nominal Valve Body & Cylinder Dimensions For a ¼ Turn (90°) Valve*
(based on the upper chamber designated for return flow)

| Dimensioned Item | Angular Width** | Formulae |
| --- | --- | --- |
| width of opening of supply ports 162 & 164 and return ports 160 & 166 (valve housing) | max 45° | max up to ½ the degrees of cylinder rotation |
| width of opening of supply crossover port 148 and return crossover port 152 (valve cylinder) | max 45° | max up to ½ the degrees of cylinder rotation |
| space between adjacent supply ports 164 & 162 and adjacent return ports 160 & 166 (valve body) | max 45° | max up to ½ the degrees of cylinder rotation |
| width of opening of supply slot port 150 or return slot port 154 (valve cylinder) | | Max up to 80 percent of cylinder diameter |
| width of opening of heat exchanger supply port 158 or heat exchanger return port 156 (valve housing) | min 45° | min up to ½ the number of degrees of rotation of the valve cylinder |
| space between heat exchanger return port 156 and adjacent return ports 160 & 166 or space between heat exchanger supply port 158 and adjacent supply ports 164 & 162 (valve housing) | min 90° | min up to the number of degrees of rotation of the valve cylinder |
| space between return slot port 154 and return crossover port 152 or supply slot port 150 and supply crossover port 148 (valve cylinder) | min 90° | min up to the number of degrees of rotation of the valve cylinder |

*Reference FIGS. 11, 12, 19-22.
**Taken from midpoint of the cylinder 108.

The above dimensions are minimum and maximum design purposes only. In fabrication these must be adjusted and compensated for based on the building tolerances to ensure that there is a complete seal formed between these various ports as required so that there can be no unwanted bleed over or bypass flow between any of the valve body openings. This necessitates that the nominal angular dimensions of the valve body and valve cylinder of the previous chart are modified to ensure proper operation. The following chart details the dimensions for the preferred embodiment valve.

Valve Body & Cylinder Dimensions For Preferred Embodiment(90°)Valve
(based on the upper chamber designated for returnsupply flow)

| Dimensioned Item | Angular Width & Tolerance |
| --- | --- |
| width of opening of return ports 160 & 166 and supply ports 164 & 162 (valve housing) | 42° +/− 2° |
| width of opening of return crossover port 152 and supply crossover port 148 (valve cylinder) | 42° +/− 2° |
| space between adjacent return ports 160 & 166 and adjacent supply ports 164 & 162 (valve body) | 48° +/− 2° |
| width of opening of return slot port 154 or supply slot port 150 (valve cylinder) | 135° +/− 2° |
| width of opening of heat exchanger return port 156 or heat exchanger supply port 158 (valve body) | 42° +/− 2° |
| space between heat exchanger return port 156 and adjacent return ports 160 & 166 or space between heat exchanger supply port 158 and adjacent supply ports 164 & 162 (valve housing) | 92° +/− 2° |
| space between supply slot port 150 and supply crossover port 148 or return slot port 154 and return crossover port 152 (valve cylinder) | 92° +/− 2° |

Looking at FIGS. 1 and 22-25 the measurement controls of the valve 102 can best be seen. Thermocouple tap 182 and the rotor sensor taps 180 extend through passages through the valve housing 104. The sensing ends of thermocouples for temperature monitoring are housed in the thermocouple tap 182 taps and relay temperature signals to instrumentation for valve control or indication.

In assembly it is known that this valve will be a close tolerance valve and that the use of thrust washers or the like between the top of the valve cylinder 108 and the bottom face of the top plate 142 will serve to force the tapered valve cylinder 108 tightly against the tapered internal walls of the valve housing 104 and load the bearings so as to stabilize the internal structure of the unit and seal the respective valve cylinder chambers from leakage.

There are numerous features and benefits to the aforementioned combined changeover and control valve such as: it replaces four valves in the conventional changeover configuration; it needs only one control output, instead of two or three; it leads to fewer components pipe and instrumentation to mount; water balancing valves are eliminated; It offers the speed in shut off like a ball valve with 45 degree isolation; it acts like a ball valve with the resultant low pressure drop making it ideal for straight line flow with minimal restrictions; it acts like a globe valve with a proportional response to position with larger valve ports, strainers are no longer needed to catch debris; larger valve ports and a simpler water path reduces water friction, and lowers pump energy; water temperature and flow sensing built into the valve itself; the valve is now truly pressure independent of supply pressure fluctuations; the valve can now be modulated to match Btu energy requirements; and the amount of heating Btu and cooling Btu consumption is now measurable at the air handler via computer.

Although depicted with two separate chambers in the valve cylinder, it is known that three or more valve cylinder chambers may be utilized with the attendant inlet and outlet connections in an alternate embodiment of the present invention. Additionally, although depicted with the upper chamber designated for RETURN flow and the bottom chamber designated for SUPPLY flow, these can be reversed, as can the designations of any ports with reference to cold and hot. For this reason the designations used above herein may also be generically described as follows:

Supply/Return crossover port=first crossover port;
Supply/Return slotted port=first slotted port;
Supply/Return crossover port=second crossover port;
Supply/Return slotted port=second slotted port;
First temperature fluid supply/return port=a first temperature fluid first port:
Second temperature fluid supply/return port=a second temperature fluid second port;
Heat exchanger valve supply/return port=a first heat exchanger valve port;
First temperature fluid supply/return port=first temperature fluid second port;
Second temperature fluid supply/return port=second temperature fluid second port; and
Heat exchanger valve supply/return port=second heat exchanger valve.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. As such, those skilled in the art will appreciate that the conception, upon which this disclosure is based, may readily be utilized as a basis for the designing of other structures, methods and systems for carrying out the several purposes of the present invention. For example while this specification discloses a 90 degree rotation valve it is known that the valve cylinder must rotate within a limited number of degrees in the valve body, but that with modifications it need not be limited to a 90 degree rotation. It is important, therefore, that the claims be regarded as including such equivalent constructions insofar as they do not depart from the spirit and scope of the present invention.

Having thus described the invention, what is claimed as new and desired to be secured by Letters Patent is as follows:

1. A dual chamber rotary valve and flowrater combination comprising:
   a valve housing having a stopped internal bore with a bore bottom face and an open top;
   a top plate that is mechanically affixed to said valve housing so as to extend over said open top, said top plate having a valve stem orifice formed there through;
   a valve cylinder matingly configured to and rotatably housed within said internal bore, said valve cylinder having a valve stem extending normally there from a cylinder top that protrudes through said valve stem orifice adapted for rotating said valve cylinder within said valve housing;
   a circular, internal central plate in said valve cylinder, dividing said valve cylinder into an upper chamber and a lower chamber, said valve chambers simultaneously operated and not in direct fluid communication with each other and said central plate having a top surface and a bottom surface;
   a fluid flowrater assembly rotatably housed within said lower chamber, said flow rater having a circular plate, said circular plate having a positive displacement vane assembly affixed thereto.

2. The dual chamber rotary valve and flowrater combination of claim 1 further comprising a first bearing residing centrally on said circular plate.

3. The dual chamber rotary valve and flowrater combination of claim 2 wherein said first bearing is a spherical bearing.

4. The dual chamber rotary valve and flowrater combination of claim 3 further comprising a first detent formed centrally on a bottom face of said internal central plate, said first detent conformed for mating contact with said first spherical bearing so as to enable rotation of said flowrater within said valve cylinder.

5. The dual chamber rotary valve and flowrater combination of claim 1 further comprising a second bearing residing centrally on a top surface of said vane assembly.

6. The dual chamber rotary valve and flowrater combination of claim 5 wherein said second bearing is a spherical bearing.

7. The dual chamber rotary valve and flowrater combination of claim 6 further comprising a second detent formed centrally on said bore bottom face, said second detent conformed for mating contact with said second spherical bearing so as to enable rotation of said flowrater within said valve cylinder.

8. The dual chamber rotary valve and flowrater combination of claim 1 further comprising:
   a first bearing residing centrally on a top face of said circular plate; and
   a second bearing residing centrally on a bottom surface of said vane assembly.

9. The dual chamber rotary valve and flowrater combination of claim 8 further comprising;
   a first crossover port formed in said upper chamber;
   a first slotted port formed in said upper chamber;
   a second crossover port formed in said lower chamber;
   a second slotted port formed in said lower chamber;
   a first temperature fluid first port in said valve housing;
   a second temperature fluid second port in said valve housing;
   a first heat exchanger valve port in said valve housing;
   a first temperature fluid second port in said valve housing;
   a second temperature fluid second port in said valve housing;
   a second heat exchanger valve port in said valve housing; and
   a flow pickup sensor in said valve housing.

10. The dual chamber rotary valve and flowrater combination of claim 9 wherein said first crossover port, said first slotted port, said first temperature fluid first port, said second temperature fluid first port and said first heat exchanger valve port all have midpoints that align about a first common plane that bisects said first valve chamber and resides parallel to said central plate; and wherein said second crossover port, said second slotted port, said first temperature fluid second port, said second temperature fluid second port and said second heat exchanger valve port all have midpoints that align about a second common plane that bisects said first valve chamber and resides parallel to said central plate;
   wherein there is always complete operational alignment between said first slotted port and said first heat exchanger valve port, simultaneous with complete operational alignment between said second slotted port and said second heat exchanger valve port.

11. The dual chamber rotary valve and flowrater combination of claim 10 wherein said valve cylinder may be rotated so that said first crossover port may be completely, partially or not at all aligned with said first temperature fluid first port or said second temperature fluid first port, and this occurs simultaneous with said second crossover port being complimentarily aligned with said first temperature fluid second supply port or said second temperature fluid second port.

12. The dual chamber rotary valve and flowrater combination of claim 11 wherein said first crossover port is dimensioned smaller than the angular space between said first temperature fluid first port and said second temperature fluid first port so as to allow for a no supply flow valve cylinder position, and wherein said second crossover port is dimensioned smaller than the angular space between said first temperature fluid second port and said second temperature fluid second port so as to allow for a simultaneous no return flow valve cylinder position.

13. The dual chamber rotary valve and flowrater combination of claim 1 wherein said stopped internal bore narrows in taper from said top to said bottom face, and said valve cylinder is tapered so as to matingly configure to said valve housing.

14. The dual chamber rotary valve and flowrater combination of claim 9 wherein said stopped internal bore narrows in taper from said top to said bottom face, and said valve cylinder is tapered so as to matingly configure to said valve housing.

15. The dual chamber rotary valve and flowrater combination of claim 1 further comprising;
  a first crossover port formed in said upper chamber;
  a first slotted port formed in said upper chamber;
  a second crossover port formed in said lower chamber;
  a second slotted port formed in said lower chamber;
  a first temperature fluid first port in said valve housing;
  a second temperature fluid second port in said valve housing;
  a first heat exchanger valve port in said valve housing;
  a first temperature fluid second port in said valve housing;
  a second temperature fluid second port in said valve housing; and
  a second heat exchanger valve port in said valve housing.

16. The dual chamber rotary valve and flowrater combination of claim 15 wherein said first crossover port, said first slotted port, said first temperature fluid first port, said second temperature fluid first port and said first heat exchanger valve port all have midpoints that align about a first common plane that bisects said first valve chamber and resides parallel to said central plate; and
  wherein there is always complete operational alignment between said first slotted port and said heat exchanger valve first port, simultaneously with complete operational alignment between said second slotted port and said second heat exchanger valve port.

17. A dual chamber rotary valve and flowrater combination comprising:
  a valve housing having a stopped internal bore with a bore bottom face and an open top;
  a top plate that is mechanically affixed to said valve housing so as to extend over said open top, said top plate having a valve stem orifice formed there through;
  a valve cylinder matingly configured to and rotatably housed within said internal bore;
  a circular, internal central plate in said valve cylinder, dividing said valve cylinder into an upper chamber and a lower chamber, said valve chambers simultaneously operated and not in direct fluid communication with each other and said central plate having a top surface and a bottom surface; and
  a fluid flowrater assembly rotatably housed within said valve cylinder; and
  wherein said upper chamber has a first set of ports formed therethrough; said lower chamber has a second set of ports formed therethrough and said valve housing has a third set four ports formed therethrough.

18. The dual chamber rotary valve and flowrater combination of claim 17 wherein said stopped internal bore of said valve housing narrows in taper from said top to said bottom face and said valve cylinder is tapered to accomplish said mating configuration.

19. The dual chamber rotary valve and flowrater combination of claim 18 further comprising:
  a first crossover port formed in said upper chamber;
    a first slotted port formed in said upper chamber;
    a second crossover port formed in said lower chamber;
    a second slotted port formed in said lower chamber;
    a first temperature fluid first port in said valve housing;
    a second temperature fluid second port in said valve housing;
    a first heat exchanger valve port in said valve housing;
    a first temperature fluid second port in said valve housing;
    a second temperature fluid second port in said valve housing; and
    a second heat exchanger valve port in said valve housing.
  wherein said first crossover port, said first slotted port, said first temperature fluid first port, said second temperature fluid first port and said first heat exchanger valve port all have midpoints that align about a first common plane that bisects said first valve chamber and resides parallel to said central plate;
  wherein said second crossover port, said second slotted port, said first temperature fluid second port, said second temperature fluid second port and said second heat exchanger valve port all have midpoints that align about a second common plane that bisects said first valve chamber and resides parallel to said central plate; and
  wherein there is always complete operational alignment between said first slotted port and said first heat exchanger valve port, simultaneous with complete operational alignment between said second slotted port and said second heat exchanger valve port.

20. The dual chamber rotary valve and flowrater combination of claim 17 wherein said valve cylinder has a valve stem extending normally therefrom a cylinder top that protrudes through said valve stem orifice adapted for rotating said valve cylinder within said valve housing.

* * * * *